Figure 1:
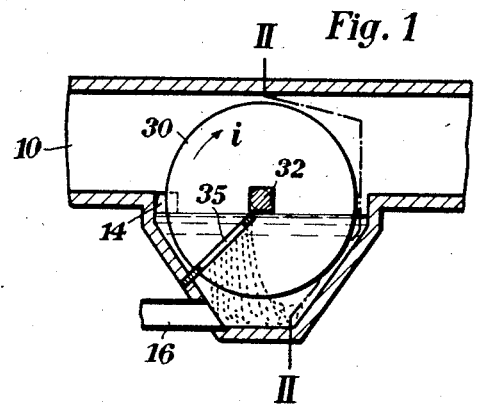

Jan. 24, 1933. C. MITTAG 1,895,201
APPARATUS FOR EVAPORATING CEMENT SLURRY
Filed Dec. 8, 1930 2 Sheets-Sheet 1

INVENTOR
CARL MITTAG
BY Karl Viertel
ATTORNEY

Jan. 24, 1933.  C. MITTAG  1,895,201
APPARATUS FOR EVAPORATING CEMENT SLURRY
Filed Dec. 8, 1930  2 Sheets-Sheet 2
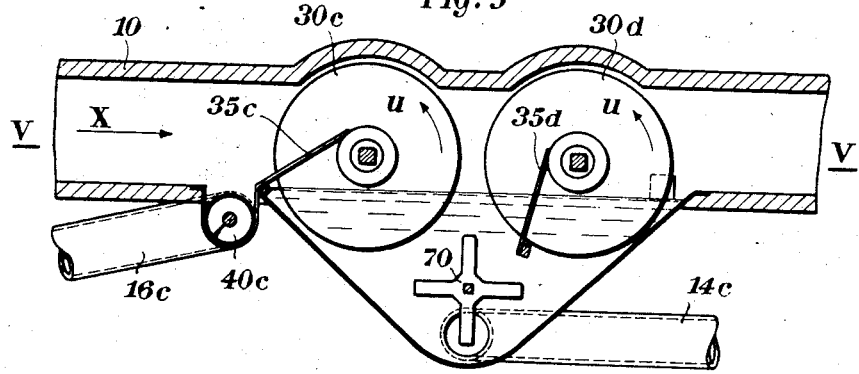
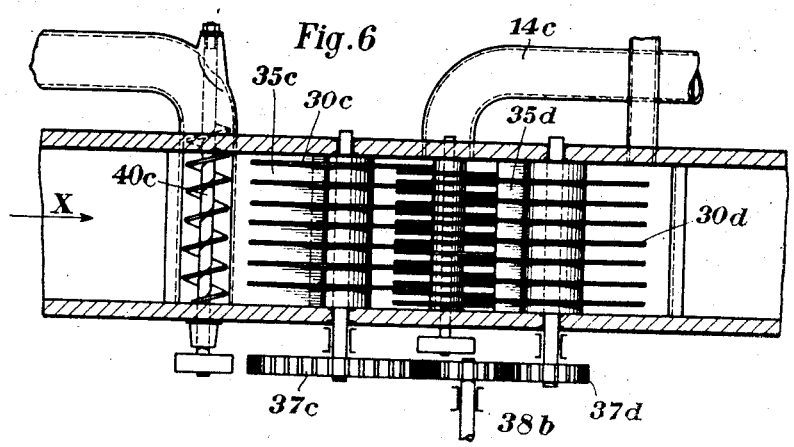
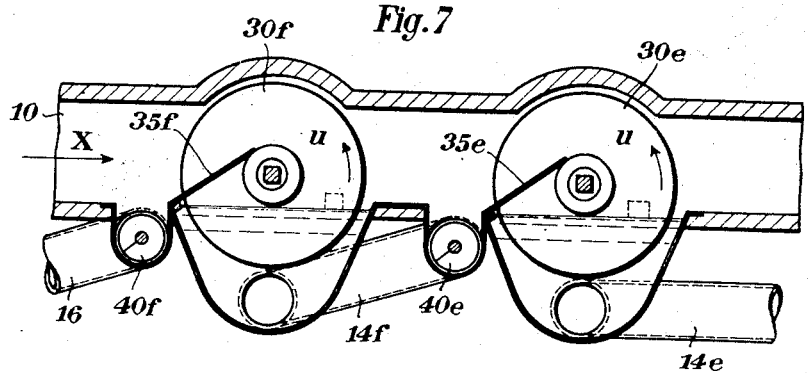
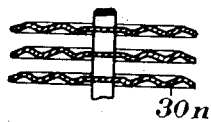
INVENTOR
CARL MITTAG
BY Karl Viertel
ATTORNEY Patented Jan. 24, 1933

1,895,201

UNITED STATES PATENT OFFICE

CARL MITTAG, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY

APPARATUS FOR EVAPORATING CEMENT SLURRY

Application filed December 8, 1930, Serial No. 500,958, and in Germany December 21, 1929.

My invention relates to improvements in the manufacture of cement and like artificial hydraulic mortars, and more especially to improved means for evaporating, drying and thickening cement slurry,—i. e. a watery or semi-liquid mixture of powdered raw materials,—prior to burning the latter in a kiln,—the principal object of evaporating the slurry being to shorten and enhance the burning process and to achieve a substantial saving of fuel.

It is known in the art of manufacturing cement to utilize the heat of the combustion gases issuing from the cement kiln for evaporating the slurry.

In the olden times—more than half a century ago—the wet slurry was simply spread out on the bottom of elongated flues or chambers through which the combustion gases were conducted on their way to the chimney, until the slurry was dried, in most cases representing a rather hard cake, the removal of which from the said chamber and comminution into small bricks involved considerable work and delay.

In more recent times slurry chambers have become known which are structurally combined with or directly attached to the feeding end of a cement kiln of the tubular rotary type, the object of said arrangement being to expose a continuous current of the wet slurry in finely divided condition to the hot combustion gases near the point where the latter issue from the kiln. Various atomizing methods and means are used for finely dividing the slurry in said chambers, such as spraying apparatus through the nozzles of which the slurry is forced under pressure, or rapidly rotating discs dipping into the slurry and reducing the latter to a spray by centrifugal force.

However these methods of evaporating the slurry by transforming it into a spray and subjecting the latter to the action of the flue gases involves considerable disadvantages—known to practitioners—also in as much as a substantial proportion of the atomized slurry is becoming overdried with the result that it is carried off in pulverlent form—as dust—with the flue gases and is thus lost, unless being subsequently recovered by special methods which however entail additional work and expenses.

The principal object of my invention is to overcome the said drawback by providing improved slurry evaporating means comprising slurry spreading and exposing apparatus of simple design which can be erected and worked at relatively low cost, and by which the slurry can be evaporated and thickened to any desired degree of plasticity consistent with the subsequent burning process.

Another object aimed at by my invention is to effectively preheat the slurry prior to the burnng process and also to recover in the course of the evaporation a substantial proportion of the pulverulent cement suspended in and carried off by the hot combustion gases issuing from the cement kiln.

Further objects of the invention and advantages obtained thereby will become apparent hereinafter.

The nature and scope of this invention are briefly outlined in the appended claims and will be more fully understood from the following specification, taken together with the accompanying drawings in which a few typical embodiments of the invention are shown by way of examples:

Fig. 1 is a section, longitudinally taken through a slurry chamber designed for conditioning the slurry according to this invention for the subsequent burning process.

Figure 2:
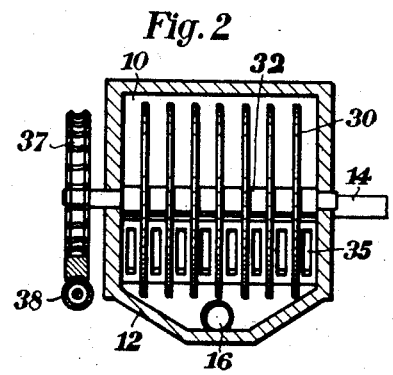
Figure 3:
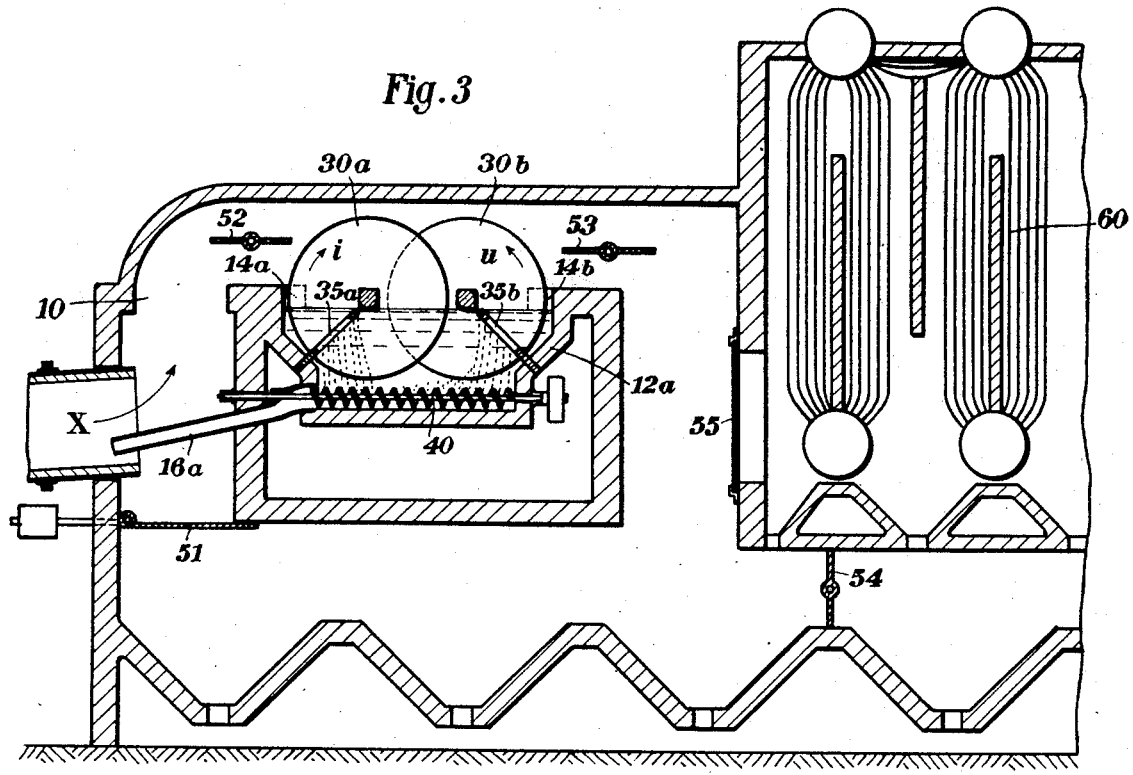
Figure 4:
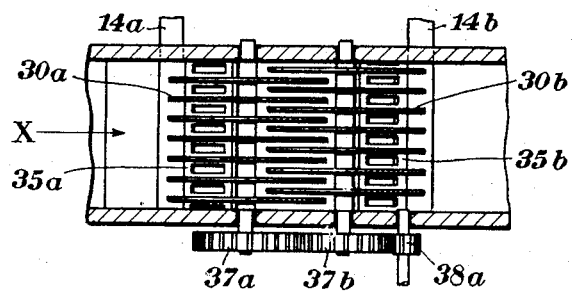

Fig. 2 is a cross section through the slurry chamber, taken on line II—II of Fig. 1, Fig. 3 is a diagrammatic layout showing a complete slurry treating plant and its cooperative connection with a tubular rotary cement kiln and with a heat recovering boiler plant, Fig. 4 is a plan view of the slurry chamber proper of Fig. 3, Figs. 5–7 are sectional views, diagrammatically showing other types of slurry treating chambers designed according to this invention, Fig. 8 is a cross section through a set of rotary discs of modified design, which may be used to advantage in any of the slurry treating chambers shown in Figs. 1–7.

One of the salient ideas of my invention is the employment of slowly rotating discs, adapted to spread out the slurry into relatively thin layers and to expose the latter to the hot gases which issue from the cement kiln and which, by coming into intimate contact with the finely spread out slurry for a considerable length of time will effectively preheat and evaporate the latter.

Referring first to the simplest form of my improved slurry treating plants, as shown in Figs. 1 and 2, 10 designates the flue of the cement kiln, through which the hot combustion gases pass on their way to the chimney.

A slurry receiving tank 12 is attached to the bottom of said flue, through which a rotary shaft 32 extends transversely, carrying a plurality of discs 30, the latter being spaced from each other and dipping into the slurry, which is supplied into the tank 12 through a pipe—not shown—or other convenient feeding means known per se.

On revolving the discs 30 in the direction of arrow $i$—e. g. by a worm gear 37, 38, attached to shaft 32, thin layers of the slurry adhering to the discs are continuously lifted upward right into the path of the hot flue gases and are thus exposed to the latter.

At the same time pulverulent cement which is usually suspended as dust in the flue gases is recovered by being caught at the wet surfaces of the discs 30 and is incorporated into the slurry.

Stripping blades 35—preferably having openings in their middle—are provided for stripping from the discs 30 the thickened slurry, as indicated in Fig. 1 which is thereupon drawn off through pipe 16 and is charged in its preheated condition into the cement kiln.

In addition to means such as valves—not shown—but known per se, for controlling the supply of the slurry to tank 12 and the discharge of the slurry from the latter, a drain pipe 14 is provided acting as an overflow and insuring the slurry tank to be filled up to a certain level.

The thickened and preheated slurry drawn off through pipe 16 may be subjected to subsequent treatment in one or more chambers of the type shown in Figs. 1 and 2.

A slurry treating plant of modified design and larger capacity is shown in Figs. 3 and 4 and comprises two sets of rotary discs $30a$ and $30b$, cooperatively arranged in slurry tank $12a$ in staggered position to each other so as to partly overlap each other's field of action.

The discs are slowly rotated in the direction of arrows $i$ and $u$ by gear wheels $37a$, $37b$, $38a$, the thickened slurry being stripped off by blades $35a$, $35b$ and being forcibly discharged by a worm conveyor 40 into the intake end of a rotary cement kiln through pipe $16a$.

Valves, such as revolvable and sliding check plates 51, 52, 53, 54, 55 are provided for controlling the path of travel of the hot flue gases. The latter generally issuing from the cement kiln in the direction of arrow $x$ first pass through the flue proper 10, including the slurry treating chamber, and thence through the furnace of a heat recovering boiler plant 60. In cases of emergency the hot gases or part thereof may be discharged directly into the chimney by turning valve plates 51, 52, 53, 54, 55 into their opened and closed positions respectively.

Another modified type of slurry treating chambers designed for evaporating the slurry in two stages, is shown by way of an example in Figs. 5 and 6, comprising two sets of rotary discs $30c$, $30d$ which are cooperatively arranged at some distance from each other in slurry tank $12c$ and are slowly rotated in the direction of arrows $u$ by gear wheels $37c$, $37d$, $38b$.

The wet slurry is supplied through a pipe $14c$. After having been first exposed by the discs $30d$ to the hot gases passing through flue 10 in the direction of arrow $x$ the slurry is returned by the stripping blades $35d$ into the tank $12c$ in which it is remixed with the wet slurry by rotary agitating arms 70.

Thereupon the slurry is exposed for a second time to the hot combustion gases by the discs $30c$ and is then delivered over the stripping blades $35c$, acting as chutes, into a worm conveyor $40c$, by which the evaporated slurry is forcibly fed into the cement kiln through pipe $16c$.

Another slurry-treating plant designed according to this invention in which the slurry is evaporated in two stages is shown in Fig. 7.

The wet slurry, supplied through pipe $14e$ is exposed to the hot combustion gases, first by the discs $30e$ and for a second time by discs $30f$, both sets of discs rotating in the direction of arrows $u$, $u$. Stripping blades $35e$ and $35f$ are provided for delivering the evaporated slurry into worm conveyors $40e$, $40f$, the latter being interconnected with each other and with the cement kiln respectively through pipes $14f$ and 16.

Various other changes and modifications may be made in the design of the slurry treating plants described above and in the shape and cooperation of their component parts, without substantially departing from the salient ideas of this invention and sacrificing any advantages obtained thereby.

E. g. discs $30n$ of undulated or corrugated cross section—as shown in Fig. 8—may be used to advantage in any of the slurry treating plants designed in accordance with this invention—instead of plain discs—in connec-

What I claim is:

1. The combination with a kiln of a flue structure communicating therewith, a slurry evaporating plant within said flue structure comprising a tank at the bottom of said flue, a plurality of rotatable disks mounted on an axis transverse to the flue and extending from substantially the bottom of said tank to the top of said flue, said disks being spaced axially from one another forming a plurality of narrow channels therebetween through which the gases of combustion from said kiln have to pass to escape from said flue.

2. The combination with a rotary kiln of a flue structure communicating therewith, a slurry evaporating plant within said flue comprising a plurality of rotatable disks extending across said flue, spaced axially from one another and forming a plurality of narrow channels through which the gases of combustion from said kiln have to pass.

3. The combination with a kiln of a flue structure communicating therewith, a slurry evaporating plant within said flue comprising a tank at the bottom of said flue, a plurality of rotatable disks having their lower portion within said tank and extending to substantially the top of said flue, said disks being spaced from one another to form a plurality of relatively narrow channels through which the exhaust gases from said kiln have to pass.

4. The combination with a kiln of a fine structure communicating therewith, a slurry evaporating plant within said flue comprising a slurry tank at the bottom of said flue, a plurality of rotatable disks mounted on an axis transverse to said flue and extending from substantially the bottom of said tank to the top of said flue, said disks being axially spaced from one another to form a plurality of narrow channels through which the gases of combustion have to pass, and means for agitating the slurry within said tank.

5. The combination with a kiln of a flue structure communicating with said kiln, a slurry evaporating plant within said flue comprising a slurry tank at the bottom of said flue, a plurality of rotatable disks mounted on an axis transverse to said flue and extending from within said tank to substantially the top of said flue, means for feeding fresh slurry into said tank and means for conducting the evaporating slurry from said tank to said kiln.

6. The combination with a kiln of a flue structure communicating with said kiln, a slurry evaporating plant within said flue comprising a slurry tank at the bottom of said flue, a plurality of rotatable disks mounted on an axis transverse to said flue and extending from within said tank to substantially the top of said flue, means for feeding fresh slurry into said tank and means for conducting the evaporated slurry from said tank to said kiln, and means within said tank for agitating the slurry within said tank.

7. The combination with a kiln of a flue structure communicating therewith, of a slurry evaporating plant within said flue structure comprising slurry tanks located at the bottom of said flue, a plurality of sets of rotatable disks mounted on axes transverse to said flue, said disks extending into said tanks and into said flue structure, said disks of each set being axially spaced from one another to form a plurality of relatively narrow channels through which the gases of combustion from said kiln have to pass, means for feeding fresh slurry into one of said tanks, means for feeding partially evaporated slurry from said tank into the second tank, means for conveying the evaporating slurry from said second tank to said kiln.

8. The combination of a slurry evaporating tank and a flue structure communicating therewith, of a slurry evaporating plant located within said flue structure comprising a plurality of rotatable disks mounted on an axis transverse to said flue, said disks being axially spaced one from another to form a plurality of narrow channels through which the gases of combustion from said kiln have to pass, and stripping blades associated with said disks for removing the evaporated slurry from said disks.

9. A combination with a kiln of a flue structure communicating therewith, a slurry evaporating plant within said flue comprising a tank located at the bottom of said flue, a plurality of rotatable disks mounted on an axis transverse to said flue, said disks extending into said tank and to substantially the top of said flue structure, stripping blades associated with said disks for removing the evaporating slurry therefrom, and agitating means within said tank for agitating the slurry within said tank.

10. The combination with a kiln of a flue structure communicating therewith, a slurry evaporating plant within said flue structure comprising a tank located at the bottom of said flue, a plurality of sets of rotatable disks mounted on an axis transverse to said flue, the disks of each set being axially spaced from one another to form a plurality of channels through which the gases passing through said flue have to pass, said disks extending from within said tank to substantially the top of said flue.

In testimony whereof I have signed my name to this specification.

CARL MITTAG.